US010561237B2

(12) United States Patent
Chan et al.

(10) Patent No.: US 10,561,237 B2
(45) Date of Patent: Feb. 18, 2020

(54) MEDICATION MANAGEMENT SYSTEM

(71) Applicants: Chi-Hong Chan, Xiluo Township (TW); Ji-Long Wu, Xiluo Township (TW)

(72) Inventors: Chi-Hong Chan, Xiluo Township (TW); Ji-Long Wu, Xiluo Township (TW)

(*) Notice: Subject to any disclaimer, the term of this patent is extended or adjusted under 35 U.S.C. 154(b) by 0 days.

(21) Appl. No.: 16/253,303

(22) Filed: Jan. 22, 2019

(65) Prior Publication Data

US 2019/0387876 A1 Dec. 26, 2019

(30) Foreign Application Priority Data

Jun. 26, 2018 (TW) ................................ 107121902 A

(51) Int. Cl.
*A47B 67/02* (2006.01)
*G06K 19/077* (2006.01)

(52) U.S. Cl.
CPC ........ *A47B 67/02* (2013.01); *G06K 19/07758* (2013.01); *A47B 2220/0097* (2013.01)

(58) Field of Classification Search
CPC ........................ A47B 67/02; G06K 19/07758
See application file for complete search history.

(56) References Cited

U.S. PATENT DOCUMENTS

| | | | | |
|---|---|---|---|---|
| 5,392,951 A * | 2/1995 | Gardner | ................. | E05B 65/46 221/125 |
| 6,109,774 A * | 8/2000 | Holmes | ................. | G07F 11/62 221/12 |
| 2004/0046020 A1* | 3/2004 | Andreasson | ............... | A61J 1/14 235/385 |
| 2009/0224638 A1* | 9/2009 | Weber | ................... | A47B 67/02 312/209 |
| 2010/0308704 A1* | 12/2010 | Rahilly | ................. | E05B 65/462 312/319.5 |
| 2011/0012491 A1* | 1/2011 | Rahilly | ............... | E05B 65/0003 312/333 |

(Continued)

FOREIGN PATENT DOCUMENTS

| | | |
|---|---|---|
| CN | 108095355 A | 6/2018 |
| TW | M542465 U | 6/2017 |
| TW | M544841 U | 7/2017 |

OTHER PUBLICATIONS

English translation of TW M544841 from espacenet (Year: 2019).*

(Continued)

*Primary Examiner* — Daniel J Rohrhoff
(74) *Attorney, Agent, or Firm* — Burris Law, PLLC

(57) ABSTRACT

A medication management system includes a cabinet, at least one drawer unit, at least one positioning unit and at least one control unit. The at least one drawer unit has an engaging portion. The at least one positioning unit includes an engaging module that separably engages with the engaging portion of the at least one drawer unit, a drive module that is operable to disengage the engaging module from the engaging portion of the at least one drawer unit, and an actuator that actuates operation of the drive unit to disengage the engaging module from the engaging portion of the at least one drawer unit based on an opening signal. The control unit is electrically connected to the actuator for outputting the opening signal.

17 Claims, 7 Drawing Sheets

(56) References Cited

U.S. PATENT DOCUMENTS

| | | | |
|---|---|---|---|
| 2011/0030034 A1* | 2/2011 | Ross | G06F 19/3462 |
| | | | 726/4 |
| 2013/0070090 A1* | 3/2013 | Bufalini | G16H 20/13 |
| | | | 348/143 |
| 2013/0112703 A1* | 5/2013 | Shoenfeld | A47B 88/994 |
| | | | 221/282 |
| 2016/0089303 A1* | 3/2016 | Latorraca | G07F 11/62 |
| | | | 312/209 |
| 2019/0231467 A1* | 8/2019 | Grimsley | A47B 88/988 |

OTHER PUBLICATIONS

Search Report appended to an Office Action, which was issued to Taiwanese counterpart application No. 107121902 by the TIPO dated Jun. 18, 2019, with an English translation thereof.

* cited by examiner

MEDICATION MANAGEMENT SYSTEM

CROSS-REFERENCE TO RELATED APPLICATION

This application claims priority of Taiwanese Patent Application No. 107121902, filed on Jun. 26, 2018.

FIELD

The disclosure relates to a management system, more particularly to a medication management system.

BACKGROUND

Hospitals and pharmacies often have to manage storage of a large quantity and a complex variety of medications. As a result, when pharmacists or other employees wish to retrieve a needed medication, they may have to spend a long time searching for the needed medication, and may accidentally select an incorrect medication that is similar either in location, name, or exterior, which is an error that may cause harm to patients.

Thus, developing a system which improves the efficiency and precision of medication retrieval is of great importance in the related industry.

SUMMARY

Therefore, the object of the disclosure is to provide a medication management system that improves the efficiency and precision of medication retrieval.

According to the disclosure, a medication management system includes a cabinet, at least one drawer unit, at least one positioning unit and at least one control unit.

The at least one drawer unit is disposed in the cabinet, and has an engaging portion and at least one drawer space.

The at least one positioning unit is mounted to the cabinet, and includes an engaging module that separably engages with the engaging portion of the at least one drawer unit, a drive module that is operable to disengage the engaging module from the engaging portion of the at least one drawer unit, a closure detector that outputs a detecting signal under engagement between the engaging module and the engaging portion of the at least one drawer unit, and an actuator that is electrically connected to the drive module and the closure detector, that receives the detecting signal, and that actuates operation of the drive unit to disengage the engaging module from the engaging portion of the at least one drawer unit based on an opening signal to thereby permit extraction of the at least one drawer unit from the cabinet.

The control unit is electrically connected to the actuator for receiving the detecting signal from the actuator and for outputting the opening signal.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
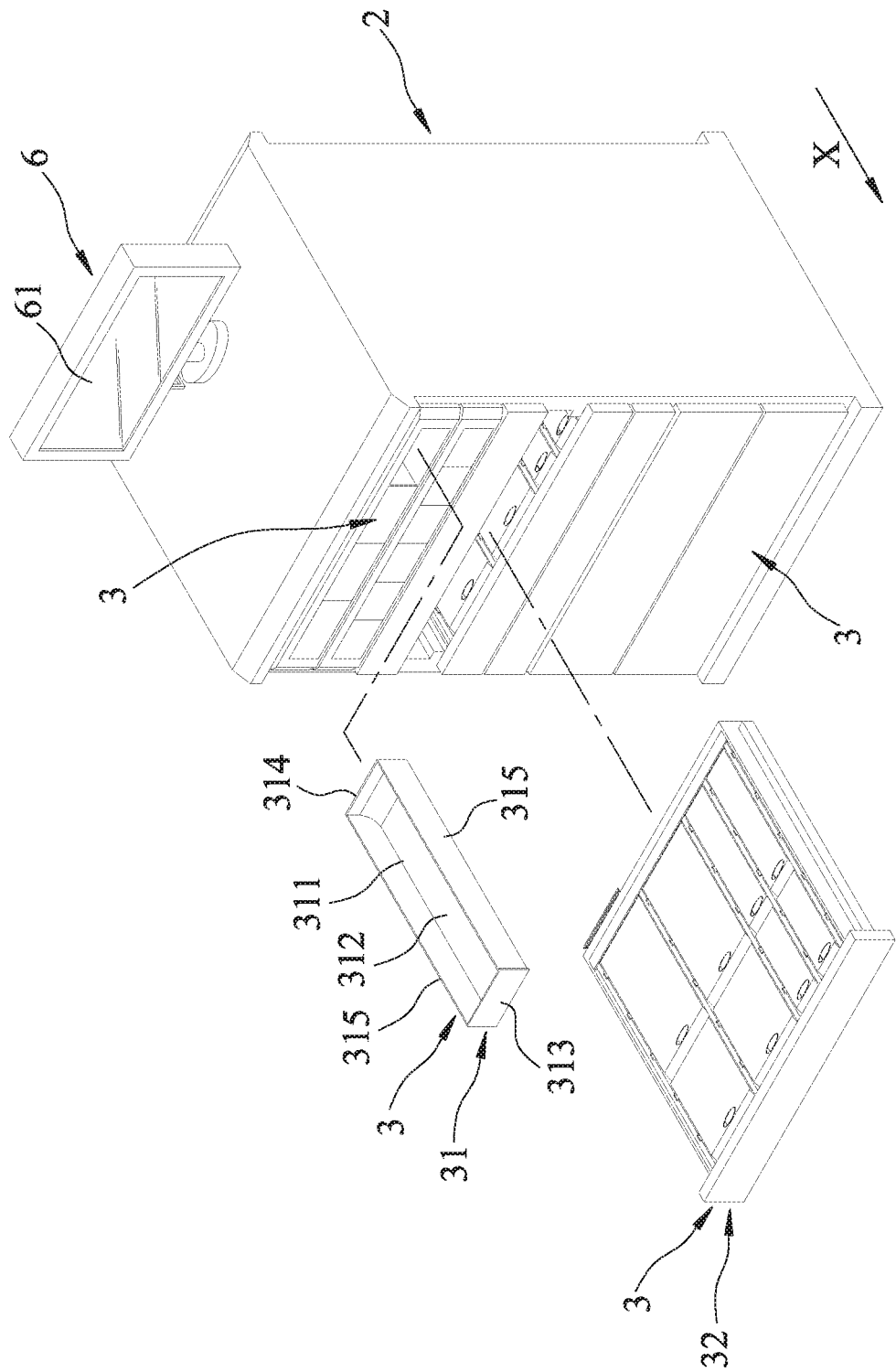
FIG. 1 is a partly exploded perspective view of an embodiment of a medication management system according to the disclosure.
Figure 2:
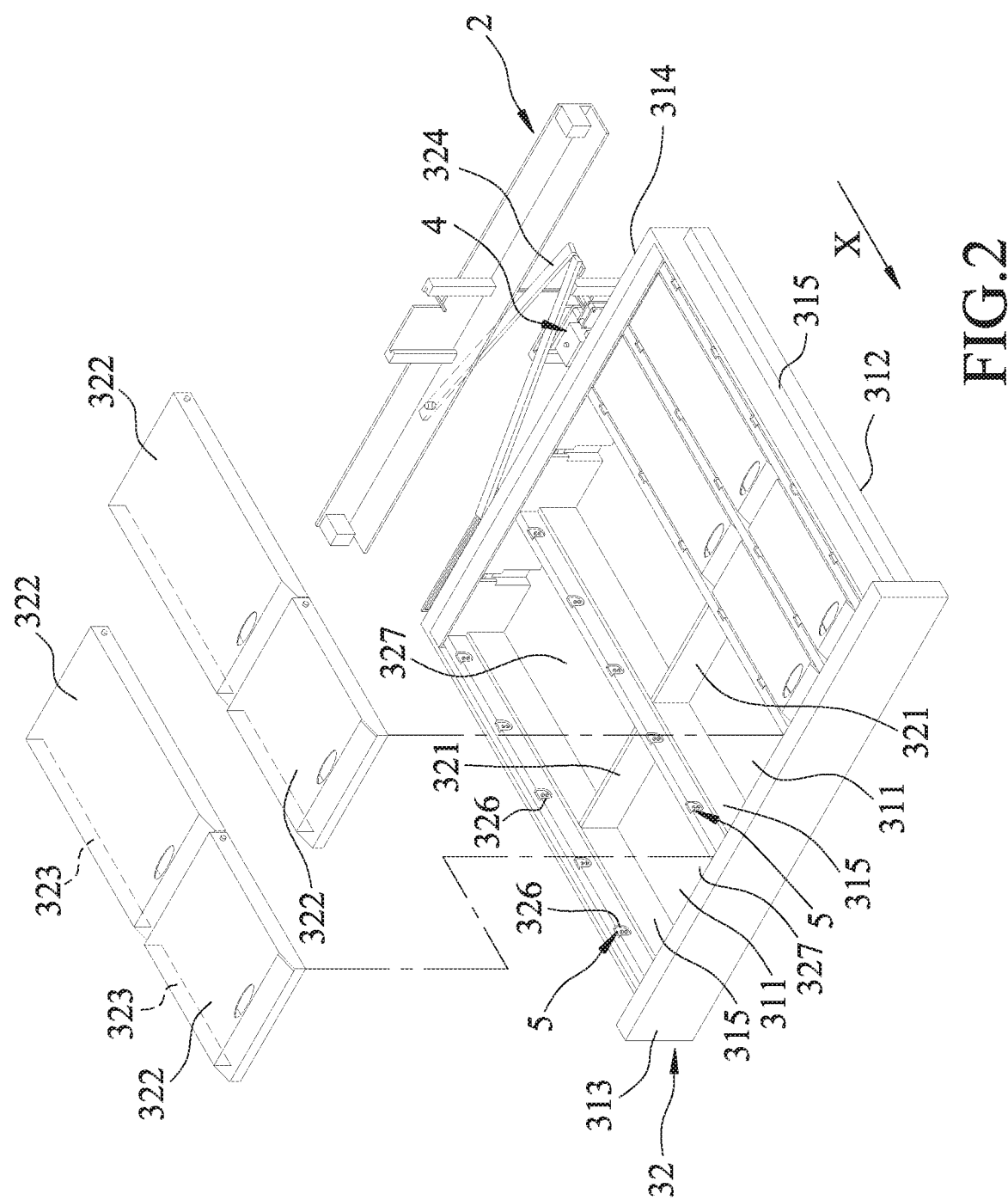
FIG. 2 is a partly exploded perspective view of a drawer unit of the embodiment.
Figure 3:
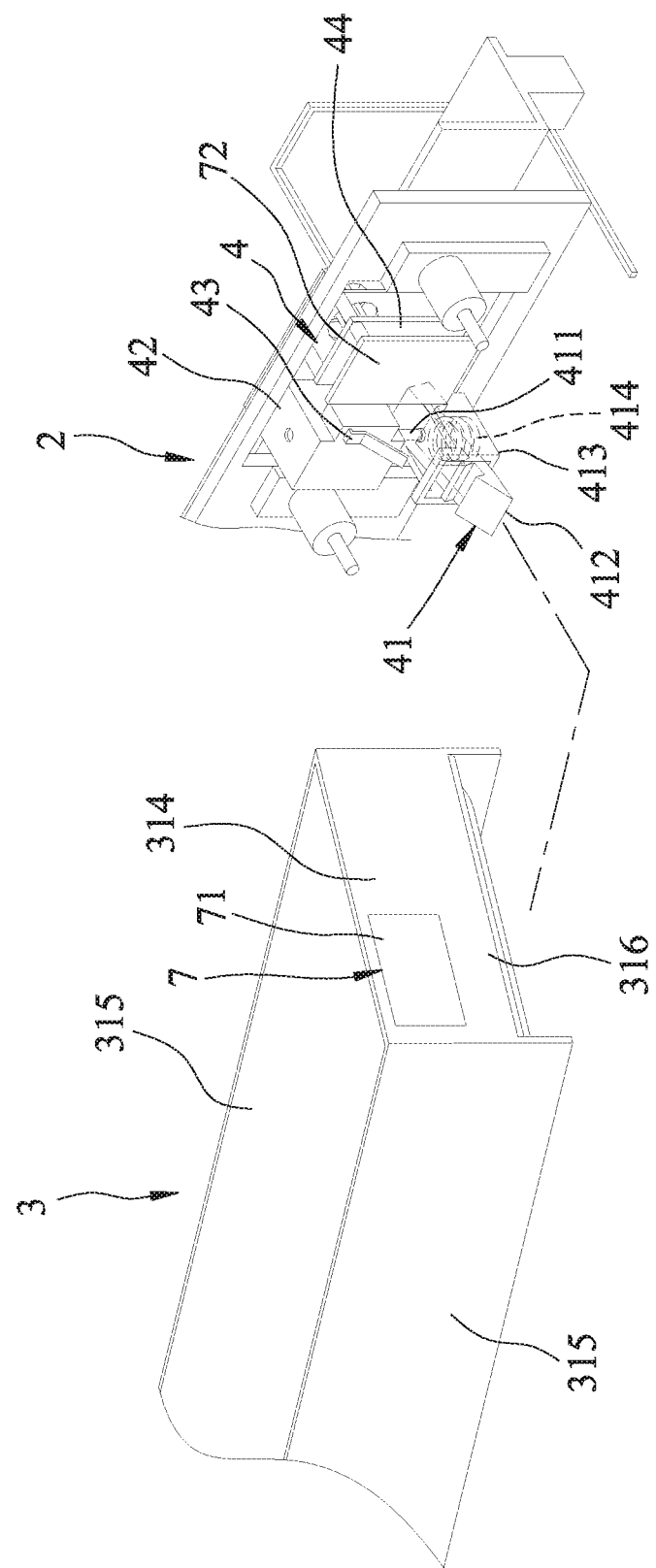
FIG. 3 is a fragmentary partly exploded perspective view illustrating the drawer unit and a positioning unit of the embodiment.

Referring to FIGS. 1 to 3, an embodiment of a medication management system includes a cabinet 2, at least one drawer unit 3 disposed in the cabinet 2, at least one positioning unit 4 mounted to the cabinet 2, a plurality of sensing units 5, a control unit 6, and at least one identification unit 7.

In this embodiment, the medication management system includes a plurality of the drawer units 3, a plurality of the positioning units 4 corresponding in position to the drawer units 3, and a plurality of the identification units 7.

Each of the drawer units 3 includes a base wall 312 having opposite ends in an extraction direction (X), a front wall 313, a rear wall 314, at least two side walls 315, and an engaging portion 316. The front wall 313 and the rear wall 314 are connected respectively to the opposite ends of the base wall 312. The at least two side walls 315 interconnect the front and rear walls 313, 314, and are spaced apart in a horizontal direction which is transverse to the extraction direction (X). The engaging portion 316 is formed on an intersection of the rear wall 314 and the base wall 312.

The at least two side walls 315 cooperate with the base wall 312, the front wall 313 and the rear wall 314 to define at least one drawer space 311. For each drawer space 311, at least one of the side walls 315 that define the drawer space 311 is formed with a passage 325 (see FIG. 7) and a plurality of through holes 326 in spatial communication with the passage 325 and the drawer space 311.

Each of the drawer units 3 may further include at least one cover 322 that covers openably the at least one drawer space 311, at least one reflector 323 that is disposed on the at least one cover 322, and at least one separation wall 321 that is disposed between the front and rear walls 313,314 and that divide the drawer spaces 311 into a plurality of space portions 327.

In this embodiment, the drawer units 3 are divided into two different types: a single-column drawer unit 31 and a multi-column drawer unit 32. Each of the single-column drawer units 31 has only one drawer space 311.

Referring to FIG. 2, each of the multi-column drawer unit 32 includes a plurality of the side walls 315, a plurality of the separation walls 321, a plurality of the covers 322, and a plurality of the reflectors 323. The side walls 315 cooperatively define a plurality of the drawer spaces 311, each of the drawer spaces 311 being defined between a respective adjacent pair of the side walls 315. Each of the separation walls 321 is disposed in a respective one of drawer spaces 311, and divides the drawer space 311 into two of the space portions 327. The covers 322 cover respectively and openably the space portions 327. The reflectors 323 are respectively disposed on the covers 322.

Each multi-column drawer unit 32 further includes an arm member 324 which connects the rear wall 314 to the cabinet 2 and extends or retracts according to opening or closing of the multi-column drawer unit 32.

Figure 4:
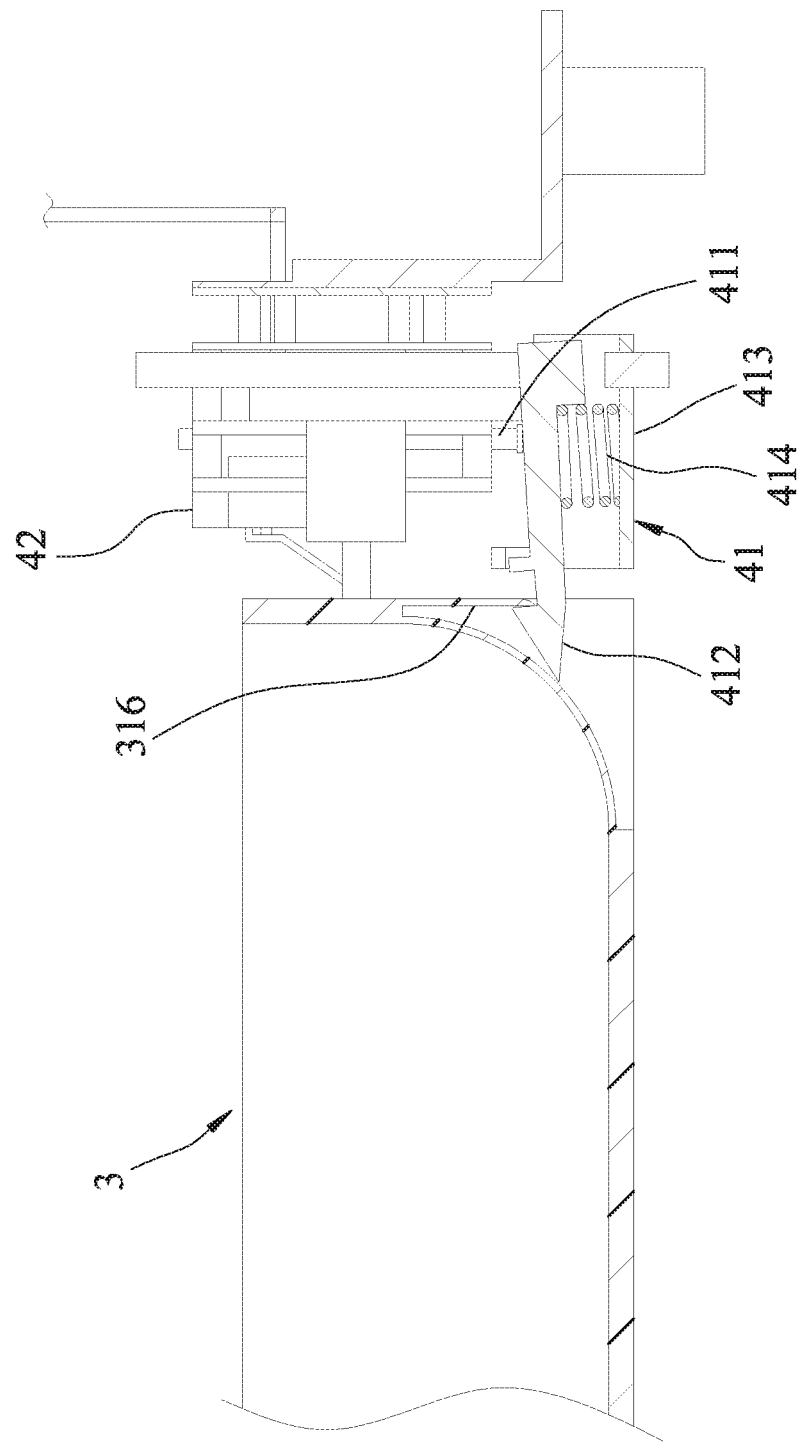
FIG. 4 is a fragmentary sectional view of the drawer unit and the positioning unit.

Referring to FIGS. 3, and 4, each of the positioning units 4 includes an engaging module 41, a drive module 42, a closure detector 43, and an actuator 44.

The engaging module 41 separably engages with the engaging portion 316 of a respective drawer unit 3. The engaging module 41 includes a drive rod 411 connected to the drive module 42, an engaging member 412 separably engaging with the engaging portion 316 of the corresponding drawer unit 3, a limiting member 413 being proximate to the engaging member 412, and a resilient member 414 disposed between the limiting member 413 and the engaging member 412. In this embodiment, the engaging member 412 is hook-shaped and is detachably hooked onto the engaging portion 316 of the respective drawer unit 3.

The drive module 42 is operable to disengage the engaging module 41 from the engaging portion 316 of the respective drawer unit 3. Specifically, the drive module 42 is operable to move the drive rod 411 downwardly to disengage the engaging member 412 from the engaging portion 316 of the respective drawer unit 3 against a resilient force of the resilient member 414. The drive module 42 may be, but is not limited to, an electromagnetic valve, a relay, a motor, or the like.

The closure detector 43 outputs a detecting signal under engagement between the engaging module 41 and the engaging portion 316 of the respective drawer unit 3. In this embodiment, the closure detector 43 is exemplified as a microswitch. Hence, when the respective drawer unit 3 abuts against the closure detector 43 as the engaging module 41 engages with the engaging portion 316 of the respective drawer unit 3, the closure detector 43 is driven to output the detecting signal.

The actuator 44 is electrically connected to the drive module 42 and the closure detector 43, and receives the detecting signal. The actuator 44 actuates operation of the drive unit 42 to disengage the engaging module 41 from the engaging portion 316 of the respective drawer unit 3 based on an opening signal to thereby permit extraction of the of the respective drawer unit 3 from the cabinet 2. In this embodiment, once the engaging module 41 is disengaged from the engaging portion 316, the respective drawer unit 3 is partially ejected from the cabinet.

Figure 5:
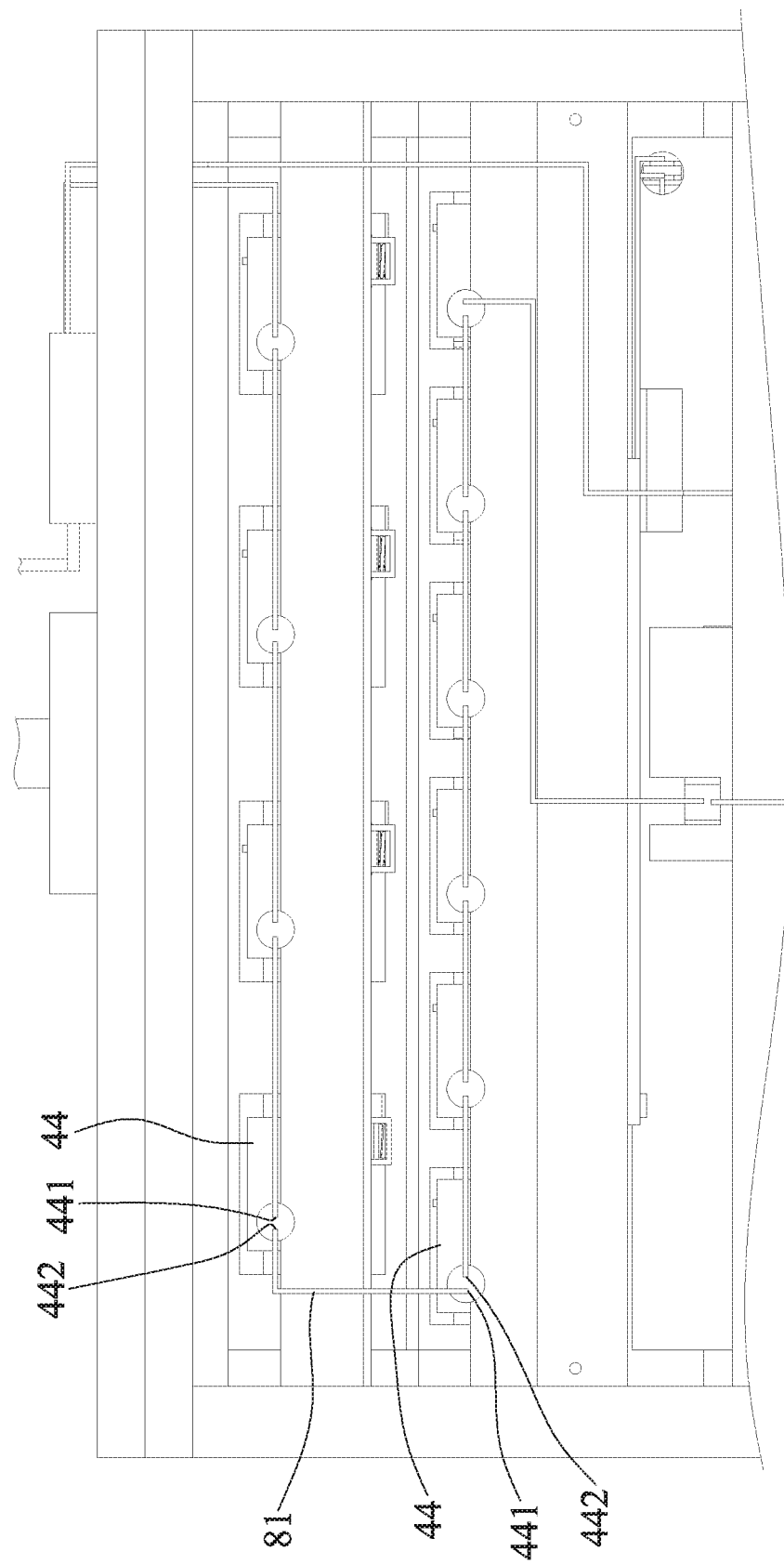
FIG. 5 is a fragmentary rear view of the back of the embodiment.
Figure 6:
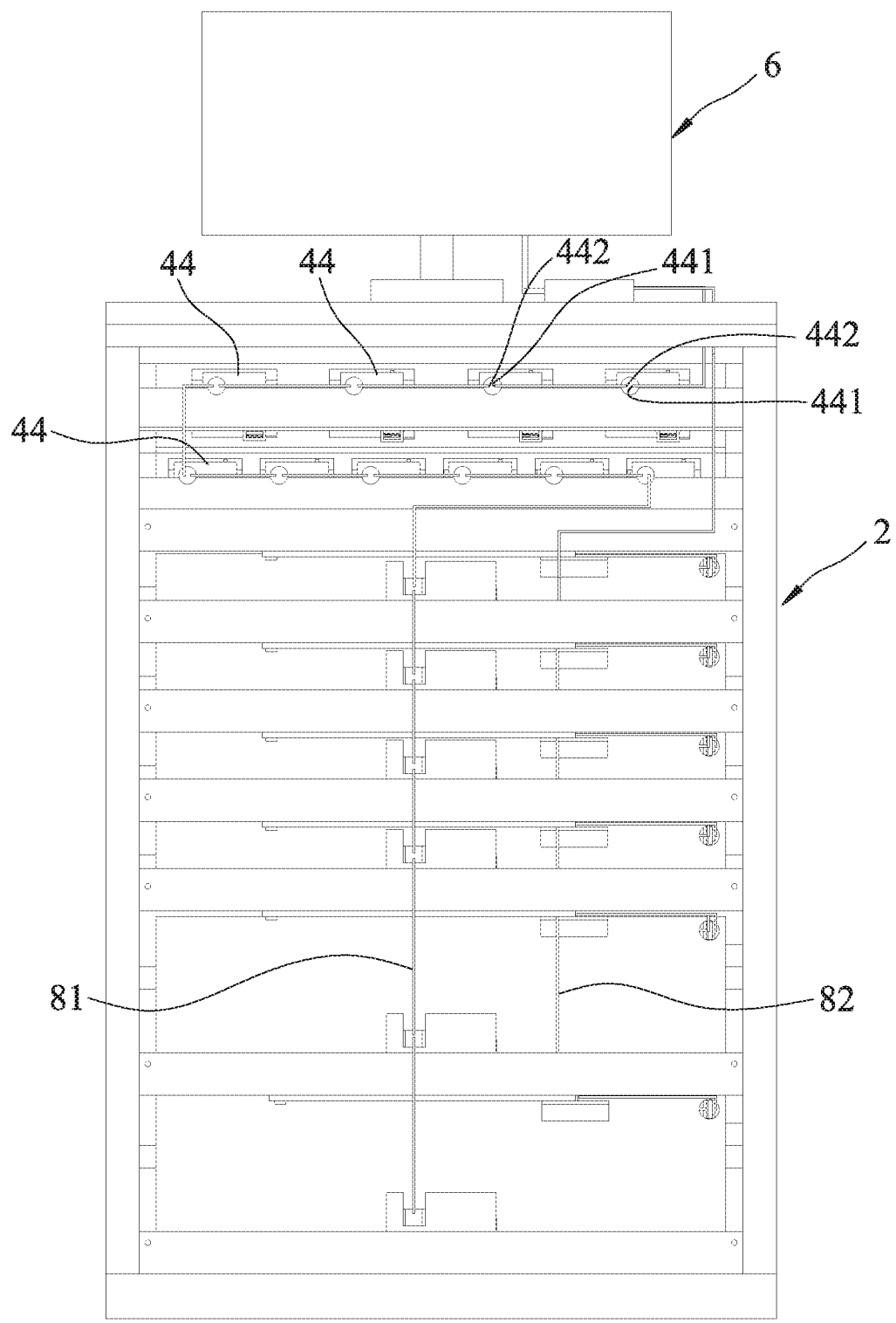
FIG. 6 is a rear view of the embodiment.

Referring to FIGS. 5 and 6, the actuator 44 of each positioning unit 4 has a first actuator port 441 and a second actuator port 442. The actuators 44 of the positioning units 4 and the control unit 6 are connected in series. Specifically, the first actuator port 411 of one of the actuators 44 is electrically connected to the control unit 6 and the first actuator port 441 of each of the remainder of the actuators 44 is electrically connected to the second actuator port 442 of a corresponding one of the actuators 44. As such, the actuators 44 may be connected to the control unit 6 using one route on a wire 81 (see FIG. 6).

Figure 7:
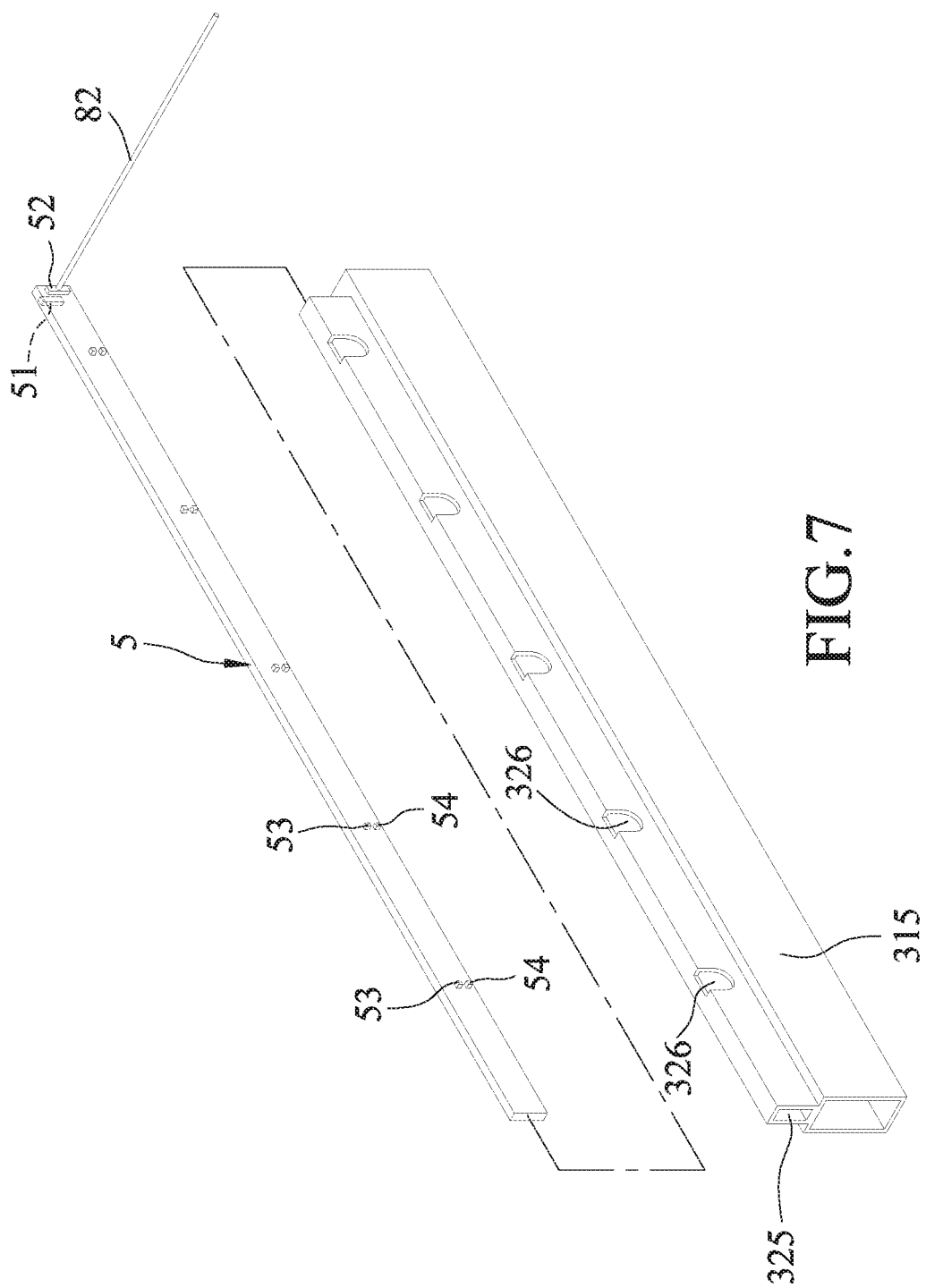
FIG. 7 is an exploded perspective view of a side wall and a sensing unit of the embodiment.

Referring to FIGS. 2 and 7, the sensing units 5 may be mounted to the drawer units 3 and correspond in position to the drawer spaces 311. Each sensing unit 5 is disposed in the passages 325 of a corresponding one of the side walls 315, and has a first sensing port 51, a second sensing port 52, at least one light source 53, and at least one photodetector 54.

Referring to FIGS. 6 and 7, the sensing units 5 and the control unit 6 are connected in series. Specifically, the first sensing port 51 of one of the sensing units 5 is electrically connected to the control unit 6 and the first sensing ports 51 of each of the remainder of the sensing units 5 are electrically connected to the second sensing ports 52 of a corresponding one of the sensing units 5. As such, the sensing units 5 may be connected to the control unit 6 using one route on a wire 82 (see FIG. 6). For the multi-column drawer units 32, the wire 82 may be disposed on the arm members 324.

Referring to FIGS. 2 and 7, the light sources 53 of the sensing units 5 are respectively paired with the photodetectors 54 of the sensing units 5, each pair being exposed from a respective one of the through holes 326 of the side walls 315. For each sensing unit 5, the at least one light source 53 is electrically connected to the first and second sensing ports 51, 52 and to the control unit 6, and is controllable by the control unit 6 to emit light. For each sensing unit 5, the at least one photodetector 54 is electrically connected to the first and second sensing ports 51, 52 for outputting a cover-shut signal when the corresponding drawer space 311 is covered by a corresponding cover 322. In this embodiment, each light source 53 is exemplified as a light emitting diode (LED), and each photodetector 54 is exemplified as an infra-red detector. In this embodiment, light emitted from each light source 53 is prevented from directly reaching the respective photodetector 54 by, for example, using a concentrated light source or surrounding the light source 53 to focus its beam.

In this embodiment, the sensing units 5 are mounted to the multi-column drawer units 32, and each sensing unit 5 includes a plurality of the light sources 53 and a plurality of the photodetectors 54. Each space portion 327 corresponds to at least one pair of the light sources 53 and the photodetectors 53. In this embodiment, each space portion 327 corresponds to multiple pairs of the light sources 53 and the photodetectors 54. Each reflector 323 is disposed for reflecting the light emitted from a corresponding one of the light sources 53 to a corresponding one of the photodetectors 54 when the respective space portion 327 is covered by the respective cover 322, thereby driving the corresponding photodetector 54 to output the cover-shut signal to the control unit 6.

Referring to FIGS. 1 and 6, the control unit 6 includes a display 61 and is electrically connected to the actuators 44 for receiving the detecting signal from the actuators 44 and for outputting different opening signals to permit extraction of different drawer units 3. In certain embodiments, each drawer unit 3 is given an address and each space portion 327 is given a sub-address, so that the control unit 6 may open a specific drawer unit 3 by outputting an opening signal specific to the address of the specific drawer unit 3, or activating the light source 53 corresponding to a specific space portion 327 by outputting a lighting signal to the sub-address of the specific space portion 327.

Referring to FIG. 3, each of the identification units 7 includes an identification member 71 disposed on a respective drawer unit 3, and an identifying module 72 electronically connected to the control unit 6 for identifying an identity of the identification member 71 and outputting to the control panel 6 an identity signal which corresponds to the identity. In this embodiment, the identification units 7 make use of Radio Frequency Identification (RFID) technology and the identification member 71 is an identification sticker containing information about medication stored in the respective drawer unit 3. When the respective drawer unit 3 is fully inserted into the cabinet 2 (i.e. when the engaging member 412 of a corresponding positioning unit 4 is in engagement with the engaging portion 316 of the corresponding drawer unit 3), the identifying module 72 can detect the information stored on the identification member 71 and output the information to the control unit 6. Thus, even if the drawer unit 3 changes location in the cabinet 2, the detecting unit 6 can still locate a specific medication.

When a user wishes to retrieve a needed medication, a list of stored medications in the medication management system may be displayed on the display 61 of the control unit 6. The user may select the needed medication from the list through the display 61, which can then display the drawer space 311 (or the space portion 327) that the needed medication is stored in. Then, the control unit 6 outputs an opening signal specific to a specific drawer unit 3 the needed medication is stored in, as well as, if applicable, a lighting signal specific to a specific space portion 327 the needed medication is stored in. The opening signal controls the positioning unit 4 to drive the opening of the specific drawer unit 3, whereas the lighting signal activates the light sources 53 corresponding to the specific space portion 327.

If the specific drawer unit 3 is one of the single-column drawer units 31, the user may directly retrieve the needed medication from the drawer space 311. If the specific drawer unit 3 is one of the multi-column drawer units 32, the light from the activated light sources 53 would indicate to the user the specific space portion 327 that the needed medication is stored in, allowing the user to quickly identify the correct location of the needed medication. The user may then remove the cover 322 corresponding to the specific space portion 327, retrieve the needed medication, then replace the cover 322 over the specific space portion 327. At this point, the sensing unit 5 may, in cooperation with the reflector 323, determine whether the cover 322 has been replaced and whether it has been replaced over the correct space portion 327, thus checking if the retrieved medication was from the correct space portion 327. The results of this check may be displayed on the display 61 of the control unit 6.

Once the needed medication has been retrieved, the user may replace the drawer unit 3 into the cabinet 2. When the back of the drawer unit 3 presses against the closure detector 43 of the respective positioning unit 4, the closure detector 43 outputs a detecting signal to the control unit 6, and another check may be done for whether medication has been retrieved from the correct drawer unit 3 and the results displayed by the display 61 of the control unit 6.

In sum, the embodiment according to the disclosure has the following benefits:

1. Cooperation between the positioning units 4 and the control unit 6 allows closure detection, locking, and opening of the drawer units 3, thereby not only improving efficiency in retrieval of needed medication, but also ensuring security of the rest of the stored medication and preventing incorrect or unauthorized retrieval of medication.

2. The light sources 53 disposed corresponding to the space portions 327 may be used as position indicators, activated by the control unit 6 when medication is to be retrieved from a specific space portion 327, thus improving the speed and accuracy of the retrieval.

3. Cooperation between the light sources 53, the photodetectors 54 and the reflectors 323 disposed on the covers 322 not only allows proper closure of the covers 322 to be checked, but also provides a way of checking whether medication has been retrieved from the correct space portions 327.

4. The actuators 44 and the sensing units 5 are connected in series, which allows for easier installation and maintenance.

5. The identification units 7 allow the control unit 6 to automatically identify information of the medication stored in each drawer unit 3, which reduces errors from manual input of the information. Further, if the drawer units 3 are relocated in the cabinet 2, the control unit 6 would still have the updated location of the medication.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A medication management system comprising:
   a cabinet;
   at least one drawer unit disposed in said cabinet, and having an engaging portion and at least one drawer space;
   at least one positioning unit mounted to said cabinet, and including
      an engaging module that separably engages with said engaging portion of said at least one drawer unit,
      a drive module that is operable to disengage said engaging module from said engaging portion of said at least one drawer unit,
      a closure detector that outputs a detecting signal under engagement between said engaging module and said engaging portion of said at least one drawer unit, and
      an actuator that is electrically connected to said drive module and said closure detector, that receives the detecting signal, and that actuates operation of said drive unit to disengage said engaging module from said engaging portion of said at least one drawer unit based on an opening signal to thereby permit extraction of said at least one drawer unit from said cabinet; and
   a control unit electrically connected to said actuator for receiving the detecting signal from said actuator and for outputting the opening signal, wherein
   said at least one drawer unit further has at least one cover that covers openably said at least one drawer space,
   said medication management system further comprises at least one photodetector that is mounted to said at least one drawer unit for outputting a cover-shut signal when said at least one drawer space is covered by said at least one cover,
   said medication management system further comprises at least one light source electrically connected to said control unit and being controllable by said control unit to emit light, and
   said at least one drawer unit further has at least one reflector disposed on said at least one cover for reflecting the light emitted from said at least one light source to said at least one photodetector when said at least one drawer space is covered by said at least one cover, thereby driving said at least one photodetector to output said cover-shut signal to said control unit.

2. The medication management system as claimed in claim 1, wherein:
said medication management system comprises a plurality of said drawer units, and a plurality of said positioning units corresponding in position to said drawer units; and
said control unit is electrically connected to said actuators of said positioning units for outputting different opening signals to permit extraction of different drawer units.

3. The medication management system as claimed in claim 2, wherein:
each of said actuators of said positioning units has a first actuator port and a second actuator port; and
said actuators and said control unit are connected in series with said first actuator port of one of said actuators being electrically connected to said control unit and with said first actuator port of each of the remainder of said actuators being electrically connected to said second actuator port of a corresponding one of said actuators.

4. The medication management system as claimed in claim 1, wherein:
said at least one drawer unit includes
a base wall having opposite ends in an extraction direction,
a front wall and a rear wall connected respectively to said opposite ends of said base wall, said engaging portion being formed on an intersection of said rear wall and said base wall,
at least two side walls interconnecting said front and rear walls, being spaced apart in a horizontal direction which is transverse to the extraction direction, and cooperating with said base wall, said front wall and said rear wall to define said at least one drawer space, and
at least one separation wall disposed between said front and rear walls and dividing said at least one drawer space into a plurality of space portions; and
said medication management system comprises a plurality of said light sources corresponding in position to said space portions.

5. The medication management system as claimed in claim 4, wherein:
said at least one drawer unit has a plurality of said covers that cover respectively and openably said space portions; and
said medication management system comprises a plurality of said photodetectors corresponding in position to said space portions for outputting said cover-shut signal when a corresponding one of said space portions is covered by a respective one of said cover.

6. The medication management system as claimed in claim 5, wherein said at least one drawer unit has a plurality of said reflectors disposed on said covers, each being disposed for reflecting the light emitted from a corresponding one of said light sources to a corresponding one of said photodetectors when a corresponding one of said space portions is covered by a respective one of said covers, thereby driving said photodetector to output said cover-shut signal to said control unit.

7. The medication management system as claimed in claim 1, wherein:

said at least one drawer unit includes a plurality of side walls that cooperatively define a plurality of said drawer spaces, each drawer space being defined between a respective adjacent pair of said side walls;
said medication management system further comprises a plurality of sensing units mounted to said at least one drawer unit and corresponding in position to said drawer spaces;
each of said sensing units has
a first sensing port,
a second sensing port,
said at least one light source electrically connected to said first and second sensing ports, and
said at least one photodetector electrically connected to said first and second sensing ports;
said sensing units and said control unit are connected in series with said first sensing port of one of said sensing units being electrically connected to said control unit and with said first sensing ports of each of the remainder of said sensing units being electrically connected to said second sensing ports of a corresponding one of said sensing units.

8. The medication management system as claimed in claim 1, wherein said engaging module includes a drive rod connected to said drive module, an engaging member separably engaging with said engaging portion of said at least one drawer unit, a limiting member being proximate to said engaging member, and a resilient member disposed between said limiting member and said engaging member, said drive module being operable to move said drive rod to disengage said engaging member from said engaging portion of said at least one drawer unit against a resilient force of said resilient member.

9. The medication management system as claimed in claim 1, further comprising at least one identification unit that includes an identification member disposed on said at least one drawer unit, and an identifying module electronically connected to said control unit for identifying an identity of said identification member and outputting to said control panel an identity signal which corresponds to said identity.

10. A medication management system comprising:
a cabinet;
at least one drawer unit disposed in said cabinet, and having an engaging portion and at least one drawer space;
at least one positioning unit mounted to said cabinet, and including
an engaging module that separably engages with said engaging portion of said at least one drawer unit,
a drive module that is operable to disengage said engaging module from said engaging portion of said at least one drawer unit,
a closure detector that outputs a detecting signal under engagement between said engaging module and said engaging portion of said at least one drawer unit, and
an actuator that is electrically connected to said drive module and said closure detector, that receives the detecting signal, and that actuates operation of said drive unit to disengage said engaging module from said engaging portion of said at least one drawer unit based on an opening signal to thereby permit extraction of said at least one drawer unit from said cabinet; and
a control unit electrically connected to said actuator for receiving the detecting signal from said actuator and for outputting the opening signal, wherein said medication management system comprises a plurality of said drawer units, and a plurality of said positioning units corresponding in position to said drawer units, said control unit is electrically connected to said actuators of said positioning units for outputting different opening signals to permit extraction of different drawer units, each of said actuators of said positioning units has a first actuator port and a second actuator port, and said actuators and said control unit are connected in series with said first actuator port of one of said actuators being electrically connected to said control unit and with said first actuator port of each of the remainder of said actuators being electrically connected to said second actuator port of a corresponding one of said actuators.

11. A medication management system comprising:
a cabinet;
at least one drawer unit disposed in said cabinet, and having an engaging portion and at least one drawer space;
at least one positioning unit mounted to said cabinet, and including
an engaging module that separably engages with said engaging portion of said at least one drawer unit,
a drive module that is operable to disengage said engaging module from said engaging portion of said at least one drawer unit,
a closure detector that outputs a detecting signal under engagement between said engaging module and said engaging portion of said at least one drawer unit, and
an actuator that is electrically connected to said drive module and said closure detector, that receives the detecting signal, and that actuates operation of said drive unit to disengage said engaging module from said engaging portion of said at least one drawer unit based on an opening signal to thereby permit extraction of said at least one drawer unit from said cabinet; and
a control unit electrically connected to said actuator for receiving the detecting signal from said actuator and for outputting the opening signal, wherein
said at least one drawer unit includes
a base wall having opposite ends in an extraction direction,
a front wall and a rear wall connected respectively to said opposite ends of said base wall, said engaging portion being formed on an intersection of said rear wall and said base wall,
at least two side walls interconnecting said front and rear walls, being spaced apart in a horizontal direction which is transverse to the extraction direction, and cooperating with said base wall, said front wall and said rear wall to define said at least one drawer space, and
at least one separation wall disposed between said front and rear walls and dividing said at least one drawer space into a plurality of space portions, and
said medication management system further comprises a plurality of light sources corresponding in position to said space portions, electrically connected to said control unit and being controllable by said control unit to emit light.

12. The medication management system as claimed in claim 11, wherein:
said medication management system comprises a plurality of said drawer units, and a plurality of said positioning units corresponding in position to said drawer units; and
said control unit is electrically connected to said actuators of said positioning units for outputting different opening signals to permit extraction of different drawer units.

13. The medication management system as claimed in claim 12, wherein:
each of said actuators of said positioning units has a first actuator port and a second actuator port; and
said actuators and said control unit are connected in series with said first actuator port of one of said actuators being electrically connected to said control unit and with said first actuator port of each of the remainder of said actuators being electrically connected to said second actuator port of a corresponding one of said actuators.

14. The medication management system as claimed in claim 11, wherein:
said at least one drawer unit further has a plurality of covers that cover respectively and openably said space portions; and
said medication management system further comprises a plurality of photodetectors corresponding in position to said space portions for outputting a cover-shut signal when a corresponding one of said space portions is covered by a respective one of said cover.

15. The medication management system as claimed in claim 14, wherein said at least one drawer unit further has a plurality of reflectors disposed on said covers, each being disposed for reflecting the light emitted from a corresponding one of said light sources to a corresponding one of said photodetectors when a corresponding one of said space portions is covered by a respective one of said covers, thereby driving said photodetector to output said cover-shut signal to said control unit.

16. The medication management system as claimed in claim 11, wherein said engaging module includes a drive rod connected to said drive module, an engaging member separably engaging with said engaging portion of said at least one drawer unit, a limiting member being proximate to said engaging member, and a resilient member disposed between said limiting member and said engaging member, said drive module being operable to move said drive rod to disengage said engaging member from said engaging portion of said at least one drawer unit against a resilient force of said resilient member.

17. The medication management system as claimed in claim 11, further comprising at least one identification unit that includes an identification member disposed on said at least one drawer unit, and an identifying module electronically connected to said control unit for identifying an identity of said identification member and outputting to said control panel an identity signal which corresponds to said identity.

* * * * *